June 29, 1965    R. W. ARNTS ET AL    3,191,976
ATTACHMENT FOR CONNECTING A STUB SHAFT TO A DRIVE SHAFT
Filed Dec. 18, 1962
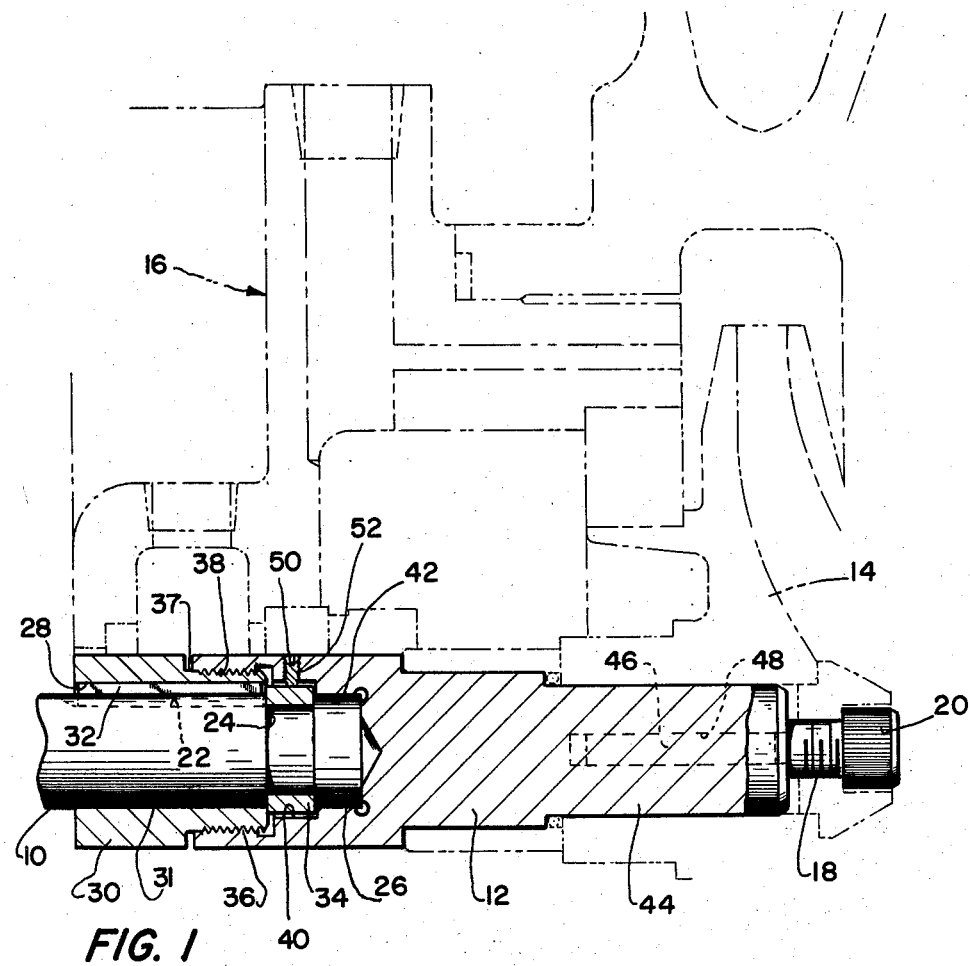
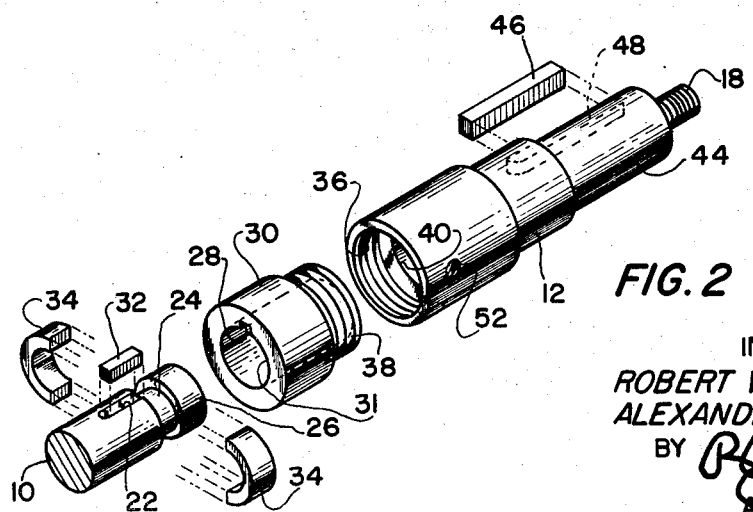
INVENTORS
ROBERT W. ARNTS
ALEXANDER BRKICH
BY
ATTORNEY United States Patent Office 3,191,976
Patented June 29, 1965

3,191,976
ATTACHMENT FOR CONNECTING A STUB SHAFT TO A DRIVE SHAFT
Robert W. Arnts, Easton, Pa., and Alexander Brkich, Phillipsburg, N.J., assignors to Ingersoll-Rand Company, New York, N.Y., a corporation of New Jersey
Filed Dec. 18, 1962, Ser. No. 245,532
2 Claims. (Cl. 287—52.05)

This invention relates to driving connections and more particularly to an attachment for connecting a stub shaft to a drive shaft.

Heretofore most power driven units, such as electric motors, gasoline engines and the like, have been provided with a projecting shaft for the accommodation of pulleys and overhung units, such as pump propellers and the like. Often the drive shaft was not of a suitable diameter or properly formed to receive the desired unit to be coupled thereto, and accordingly a supplementary shaft, such as a stub shaft, had to be introduced on the main shaft or drive shaft which would have at one end a suitable diameter to receive the desired unit. Commonly, adaptors have been used in some order to link one shaft with another, or add a stub on the main shaft.

In order to overcome the foregoing difficulties elaborate systems of shaft extensions, coupling devices, and adaptors for coupling devices have been used to extend the length of the main power shaft in order to accommodate such devices as pulleys and pump propellers.

It is the general object of the present invention to avoid and overcome the foregoing and other difficulties of and objections to prior art practices by the provision of a well constructed and inexpensive stub shaft.

Yet another object of this invention is to provide a simple attachment for such shafts to enable the stub shaft to be connected securely against withdrawal from the main shaft and to form an integral unit therewith.

Other objects and advantages will in part be obvious and in part will be pointed out as the description of the invention proceeds.

The aforesaid objects of the present invention, and other objects which will become apparent as the description proceeds, are achieved by providing a drive shaft with an annular groove near its end and an end portion located between the annular groove and the end of the drive shaft, mounting a key coupling sleeve on the drive shaft on the opposite side of the groove from the end portion of the drive shaft, mounting a split ring in the annular groove to abut the coupling sleeve for preventing the sleeve from being moved axially over the annular groove and the end portion of the drive shaft, and mounting a stub shaft on the drive shaft in axial alignment with the stub shaft having an axial bore receiving the end portion of the drive shaft. The stub shaft has a shoulder abutting the split ring so that the split ring is clamped between the coupling ring and the stub shaft, and the stub shaft is threaded to the coupling sleeve to hold the stub shaft in place on the drive shaft.

For a better understanding of the present invention, reference should be had to the accompanying drawings wherein like numerals of reference indicate similar parts throughout the several views and wherein:

FIGURE 1 is a longitudinal section through the drive and stub shaft portions of associated apparatus such as a centrifugal pump, and FIGURE 2 is an exploded perspective view of the various parts of the present invention disclosed in FIGURE 1.

Although the principles of the present invention are broadly applicable to drive shafts and stub shaft extension of the drive shaft, the present invention is particularly adapted for use in conjunction with pumps and motors and hence it has been so illustrated and will be so described.

With specific reference to the form of the present invention illustrated in the drawings, and referring particularly to FIGURE 1, driving means, such as a drive shaft, is indicated generally by the reference numeral 10. The drive shaft 10 is adapted to receive a suitable driven means or extension means, such as a stub shaft 12, which for purposes of illustration is shown to be driving an impeller 14 of a centrifugal pump 16 as indicated by the broken lines in FIGURE 1. It should be noted that the use of the centrifugal pump 16 is for illustrative purposes only, and that the stub shaft connecting device may be used for other purposes as well, such as pulley connections, and most devices which would require an extension of the drive shaft. The general arrangement of the pump 16 therefore forms no part of this invention except to illustrate that quite often a stub shaft of considerable length is provided for an overhung type impeller 14 or other devices requiring elongated shafts.

Structurally, the driving means hereinafter referred to as the drive shaft 10, under normal circumstances, would have a threaded end portion 18, as here shown on the free end of the stub shaft 12, to receive a nut 20 thereby holding the impeller 14 in position on the stub shaft 12. One convenient method of providing for the connection of the impeller 14 or the like, is to provide the stub shaft 12 with a threaded portion 18 adapted to receive a nut 20 for holding the impeller 14 on the stub shaft 12.

For purposes to be hereinafter described the drive shaft 10 is provided with a key way 22 which extends axially and terminates in an annular groove 24 near the end 26 of the drive shaft 10. The shaft end 26 is preferably the full shaft diameter, as shown in FIGURE 1.

In order to provide a driving connection between the drive shaft 10 and the stub shaft 12 an adaptor means, such as a sleeve nut 30 is provided which has a key way 28 cut therein. The adaptor means, hereinafter referred to as the sleeve nut 30, has an inner bore 31 which is substantially the same diameter as the drive shaft 10 so that the drive shaft 10 may slidingly fit within the sleeve nut 30. It is advisable to provide some means of maintaining the alignment relationship between the drive shaft 10 and the sleeve nut 30. One way of accomplishing this is to provide a key 32 which fits into the aforementioned key way 22 on the drive shaft 10 and into the key way 28 on the sleeve nut 30. In this manner the sleeve nut 30 will be interconnected to the drive shaft 10. In order to prevent the sleeve nut 30 from moving axially in the direction of the free end or the shaft end 26 of the drive shaft 10 when the sleeve nut 30 is slipped onto the drive shaft 10, a split ring 34 (of larger outside diameter than the drive shaft 10, FIGURE 1) is provided which fits into the annular groove 24 on the drive shaft 10. In this manner the split ring 34 provides an abutment for the sleeve nut 30 when the sleeve nut 30 is placed on the drive shaft 10 and therefore prevents the sleeve nut 30 from moving toward the free end 26 of the drive shaft 10.

In order to connect the stub shaft 12 to the drive shaft 10, the sleeve nut 30 is provided with a reduced end portion 37 which is threaded, as at 38. The stub shaft 12 is provided with a threaded end 36 which can be screwed onto the threaded end 38 of the sleeve nut 30, to draw the sleeve nut 30 solidly against the split ring 34 which is held in place in a counter bore 40 in the end of the stub shaft 12.

It is desirable to align the drive shaft 10 and the stub shaft 12, and to this end a bore 42 is provided in the stub shaft 12 which is concentric with the axis of the shaft 10 and the stub shaft 12 so that the end 26 of the drive shaft 10 may fit into the bore 42. Thus, when the stub shaft 12 is screwed onto the sleeve nut 30 the stub shaft 12 is drawn up so that the end 26 of the drive shaft 10 seats solidly in the bottom of the bore 42 and the sleeve nut 30 is drawn up so as to abut the split collar 34 resulting in the stub shaft 12 forming an integral unit with the drive shaft 10. In this manner the proper driving of the associated unit (the impeller 14 which may be fitted to a suitably formed end 44 of the stub shaft 12) may be accomplished expeditiously and efficiently.

As seen in FIGURE 1, the preferred embodiment, there is indicated one manner of connecting the impeller 14 with the stub shaft 12, such as by providing a key 46 which is adapted to seat in a key way 48 on the end 44 of the stub shaft 12.

It may arise that the split ring 34, unless perfectly seated in the annular groove 24 on the drive shaft 10, may have some axial movement. In order to overcome this movement a screw hole 52 is provided in the stub shaft 12 and a set screw 50 is receivable therein so that when the stub shaft 12 is in position and meeting with the sleeve nut 30 the set screw 50 may be tightened against the split collar 34 thereby holding it in place during the operation of the drive shaft 10.

In order that it will be clearly understood how the stub shaft connecting means is connected to the drive means the assembly operation will now be described.

*Assembly operation*

In order to connect the stub shaft 12 to the drive shaft 10, the sleeve nut 30 is slipped onto the drive shaft 10 and the key 32 is seated in the key way 22. With the key 32 in the key way 22, the key way 28 on the sleeve nut 30, is engaged by the key 32 thereby aligning the sleeve nut 30 with the drive shaft 10. The split ring 34 is then placed in the annular groove 24 and the sleeve nut 30 is then brought back up against the split ring 34 to the position it will finally assume (as shown in FIGURE 1). The stub shaft 12 is then slipped over the end 26 of the drive shaft 10 and screwed onto the threaded portion 38 of the sleeve nut 30 to encircle the split collar 34 and the end 26 of the drive shaft 10. With the stub shaft 12 in such a position (and after it has been tightened onto the sleeve nut 30 as far as it will go) the set screw 50 is placed in the screw hole 52 and is then tightened. The stub shaft connecting means or unit is then in condition for accommodation of whatever driven apparatus the stub shaft 12 is to receive.

It will be recognized by those skilled in the art that the objects of the present invention have been achieved by the provision of a simple means for attaching extension means to a drive means, which simple means has a minimum of cost and yet provides a reliable and strong linkage between the driving shaft and the stub shaft.

While in accordance with the patent statutes a preferred embodiment of the present invention has been illustrated and described in detail, it is to be particularly understood that the invention is not limited thereto or thereby.

We claim:
1. A joint for connecting a drive shaft and a stub shaft together for transmitting rotation to high speed machinery such as pumps or the like, comprising:
(a) a drive shaft having an annular groove near its end and an end portion located between the annular groove and the end of the drive shaft;
(b) a threaded coupling sleeve keyed on said drive shaft on the other side of said annular groove from said end portion;
(c) a split ring mounted in said annular groove to abut said coupling sleeve and prevent it from being moved axially over said annular groove and said end portion; and
(d) a one piece stub shaft mounted on said drive shaft in axial alignment;
(e) said stub shaft having an axial bore snugly receiving said end portion of said drive shaft and a shoulder surface abutting said split ring so that said split ring is clamped between said coupling sleeve and said stub shaft;
(f) said stub shaft further having a tubular threaded end portion projecting beyond the other side of said annular groove and threaded to said coupling sleeve to hold said stub shaft in place on said drive shaft.
2. The joint of claim 1 including:
(a) a set screw mounted in said stub shaft and engaging said split ring to aid in holding said split ring in position.

References Cited by the Examiner
UNITED STATES PATENTS

| | | | |
|---|---|---|---|
| 789,222 | 5/05 | Lovekin | 285—415 X |
| 1,429,982 | 9/22 | Tubbs | 287—52 X |
| 1,464,337 | 8/23 | Price et al. | 287—117 |
| 1,634,499 | 7/27 | Holdsworth | 64—9 |
| 1,665,655 | 4/28 | Clisson | 285—356 X |
| 2,016,262 | 10/35 | Arey et al. | 285—415 X |
| 2,318,575 | 5/43 | Armington et al. | 285—414 X |
| 2,472,307 | 6/49 | Nagel | 285—415 X |
| 2,482,229 | 9/49 | Weaver | 287—52 |
| 2,516,472 | 7/50 | MacKeage | 287—52.05 |
| 2,768,847 | 10/56 | Peyrin et al. | 285—415 X |
| 2,944,847 | 7/60 | Chadowski | 287—117 |
| 3,085,820 | 4/63 | Pollia | 285—415 X |

FOREIGN PATENTS
828,177   1/52   Germany.

CARL W. TOMLIN, *Primary Examiner.*